Sept. 1, 1964        R. E. McKINNEY        3,146,997
APPARATUS FOR LEVELING BULK MATERIAL IN A CONTAINER
Filed Oct. 25, 1961        2 Sheets-Sheet 1
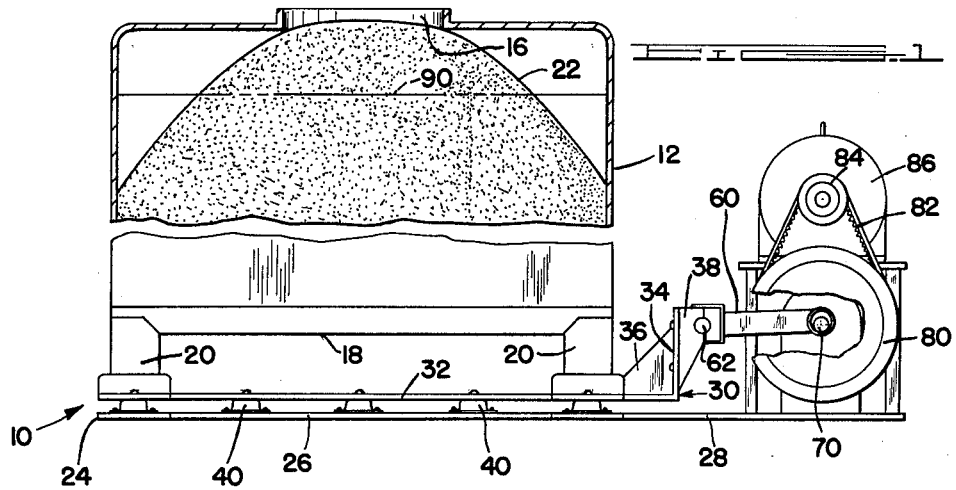
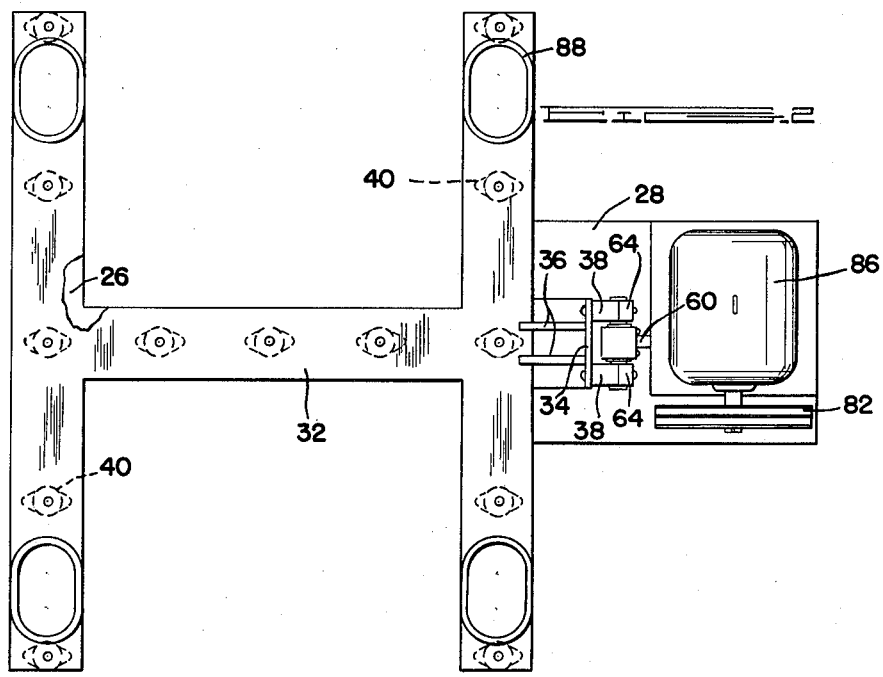
*INVENTOR.*
RALPH E. McKINNEY
BY
OLSEN AND STEPHENSON
ATTORNEYS Sept. 1, 1964 R. E. McKINNEY 3,146,997
APPARATUS FOR LEVELING BULK MATERIAL IN A CONTAINER
Filed Oct. 25, 1961 2 Sheets-Sheet 2
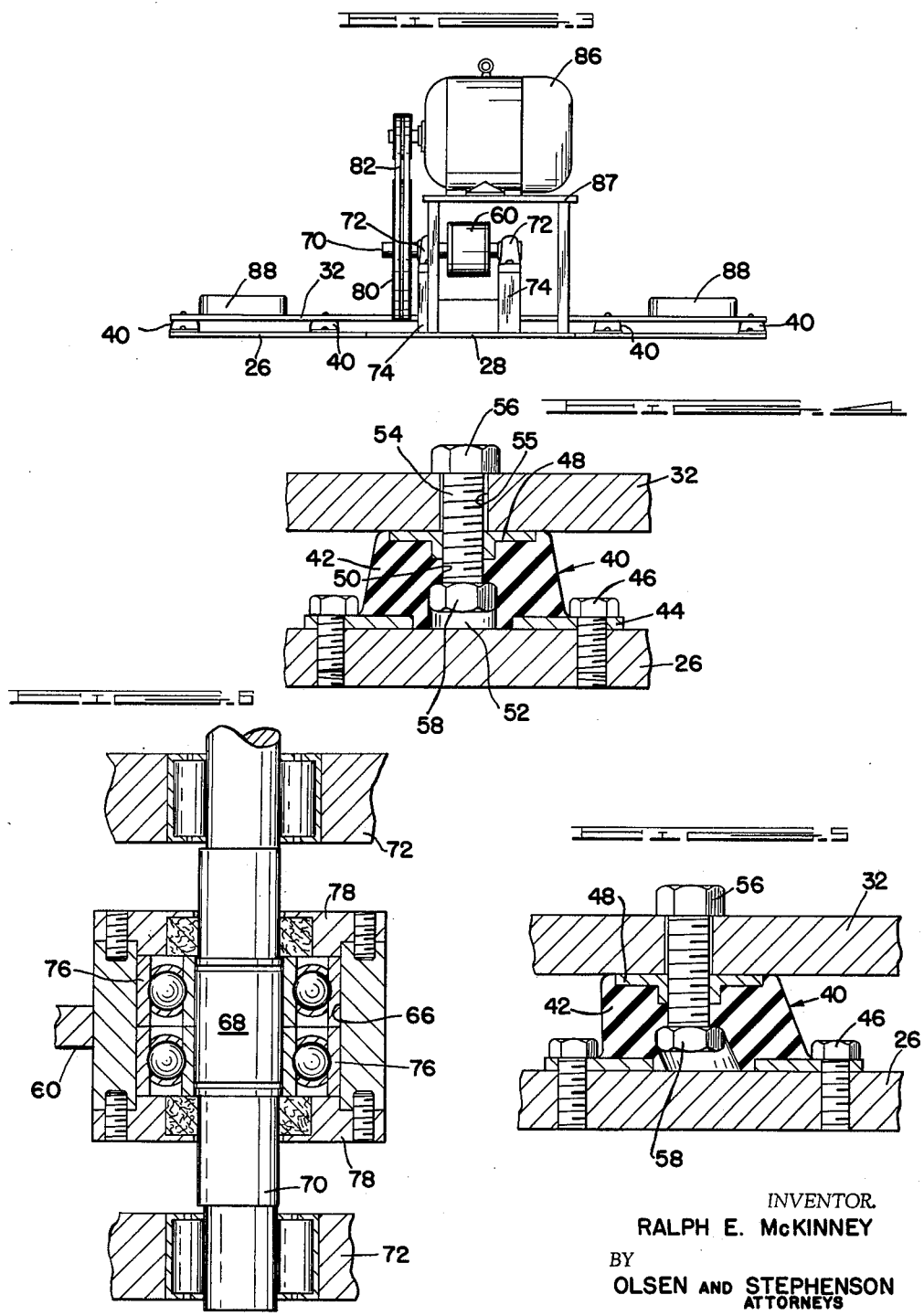
INVENTOR.
RALPH E. McKINNEY
BY
OLSEN AND STEPHENSON
ATTORNEYS United States Patent Office 3,146,997
Patented Sept. 1, 1964

3,146,997
APPARATUS FOR LEVELING BULK MATERIAL
IN A CONTAINER
Ralph E. McKinney, Beatrice, Nebr., assignor to Hoover
Ball and Bearing Company, Ann Arbor, Mich., a corporation of Michigan
Filed Oct. 25, 1961, Ser. No. 147,665
2 Claims. (Cl. 259—75)

This invention relates generally to the art of loading containers, bins and the like with granular or similar materials which tend to mound when loaded into a bin, such as flour, sugar, dry plastics, coffee beans, chemicals, pellets, powders and the like, and more particularly to an improved method and apparatus for leveling such material in a bin during the loading of the bin.

In the loading of a bin or container which is loaded through a top opening, granular and similar materials tend to mound in the container so that unless provisions are taken to level the material loaded in the container, all of the container space is not utilized for load carrying purposes. It is an object of this invention, therefore, to provide an improved apparatus for rapidly leveling the upper surface of the bin contents without involving any damage or rough handling of the bin or the bin contents. When the bin is being loaded with a material in a pellet or similar form, leveling of the bin contents without breakage of the pellets is desirable since fines in such materials are usually objectionable, and it is an object of this invention to level the material without any such breakage.

A further object of this invention is to provide an improved apparatus for leveling the contents of a bin which is economical to manufacture and easy to operate and install.

Further objects, features and advantages of this invention will become apparent from a consideration of the following description, the appended claims, and the accompanying drawing in which:

FIGURE 1 is a side elevational view of the leveling apparatus of this invention, showing a bin mounted thereon and with a portion of the bin being broken away for the purpose of illustrating the mounded granular contents thereof prior to leveling;

FIGURE 2 is a plan view of the leveling apparatus of this invention;

FIGURE 3 is an end view of the leveling apparatus of this invention;

FIGURE 4 is a fragmentary vertical sectional view of a resilient mounting member in the apparatus of this invention, showing the mounting member in a normal or neutral position thereof;

FIGURE 5 is a vertical sectional view of the mounting member shown in FIG. 4, illustrating the member in a position moved to the left relative to the position shown in FIG. 4; and FIGURE 6 is a horizontal sectional view of a drive shaft and connecting rod assembly in the leveling apparatus of this invention.

With reference to the drawing, the leveling apparatus of this invention, indicated generally at 10, is shown in FIG. 1 supporting a bin 12 having a body 14 provided with a top filling opening 16, a bottom wall 18 and four downwardly extending supporting legs 20, only two of which are shown. The bin 12 is illustrated as being partially filled with a mass 22 of a granular material loaded into the body 14 so that it has assumed a mounded shape which extends upwardly a distance sufficient to prevent further loading of the bin 12 through the opening 16. As used herein, the term "granular" material is inclusive of any substantially dry bulk material which is of sufficiently small particle size to enable it to be loaded into the body 14 through the opening 16 and which can be handled or manipulated so that its top surface occupies a substantially horizontal plane. Examples of such material are flour, sugar, vinyl resins, powders such as milk, dentrifice, detergents, cement, coal, and plastics. As shown in FIG. 1, when this material is loaded into the bin 12, its angle of repose is such that it forms a mound which prevents the upper end of the bin 12 from being fully utilized for containing the material.

The apparatus 10 consists of a base member 24 which may be secured to a floor surface or the like (not shown) and which has a generally H-shape section 26 and a rectangular section 28 which is arranged in a side-by-side relation with the section 26. A container supporting unit 30 consists of a generally H-shape plate 32 which is of substantially the same size and shape as the H-shape base section 26 and in one position (FIGS. 1 and 2) is positioned above and in vertical alignment with the section 26. An angle shape bracket 34 is secured to one side of the plate 32 and is positioned above the base section 28. Stiffener ribs 36 are secured to the bracket 34 which also carries a pair of horizontally spaced bearing plates 38 for a purpose to appear presently.

The support plate 32 is mounted on the base section 26 by a plurality of mounting members 40 (FIGS. 4 and 5), each of which includes a body 42 formed of a resilient yieldable material such as rubber or the like. In each member 40, the body 42 is bonded to a mounting plate 44 which is secured by bolts 46 to the base section 26 so that the body 42 projects upwardly from the base section 26. An internally threaded cap plate 48 is embedded in the upper end of each body 42 in axial alignment with an opening 50 which extends axially through the body 42 and communicates at its lower end with an enlarged cavity 52. The bin support plate 32 rests on the upper ends of the mounting members 40 and is secured thereto by bolts 54 which have their heads 56 engaged with the top surface of the plate 32 and their shanks threadably engaged with the cap plates 48. A nut 58 is threaded onto the lower end of each bolt 54 and is disposed in a cavity 52 so as to securely attach the support plate 32 to the mounting members 40. By virtue of the inclusion in each mounting member 40 of the resilient yieldable body 42 which will bend or deform in a horizontal direction so that its top end is horizontally movable relative to its bottom or secured end, the bin supporting plate 32 is also shiftable in a substantially horizontal plane both to the left and right of the position shown in FIG. 4 in which the body 42 is in an undeformed or unstressed position. A position of the support plate 32 in which it is moved to the left of the position shown in FIG. 4 is illustrated in FIG. 5. As shown therein, the resilient body 42 deforms or yields to accommodate the relative horizontal movement between the plate 32 and the base section 26. Although not shown, it is apparent that each of the mounting members 40 is similarly yieldable to permit a movement of the support plate 32 to the right relative to the base section 26 from the position shown in FIG. 4.

It can thus be seen that by virtue of the support of the bin supporting plate 32 on the mounting members 40, the support plate 32 is shiftable back and forth in a horizontal plane relative to the base member 24. In the apparatus 10, this shifting movement is effected by a connecting rod 60 which at one end is supported on a shaft 62 rotatably supported on the bearing plates 38 and bearing end plates 64 secured to the plates 38. The opposite end of the connecting rod 60 is provided with a cylindrical opening 66 which is supported on the eccentric center section 68 of a drive shaft 70 which is rotatably supported in pillow block assemblies 72 mounted on leg members 74 carried on the base section 28. Bearings 76 are maintained in the opening 66 by end caps 78 mounted on the connecting rod. A flywheel 80 secured to one end of the drive shaft 70 is driven by a belt 82 which is also trained about a sheave 84 carried by a motor 86 which is mounted on a frame 87 that is supported on the base section 28. As a result, on operation of the motor 86 to rotate the sheave 84, flywheel 80 is rotated so as to rotate the drive shaft 70 which effects horizontal reciprocal movement of the shaft 62 connected to the connecting rod 60. Movement of the shaft 62 effects a similar horizontal reciprocal movement of the bin supporting plate 32. This reciprocal movement of the plate 32 in a substantially horizontal plane is utilized to effect leveling of the mass of granular material 22 in the bin 12 as is hereinafter explained.

In the use of the apparatus 10, a bin 12 is supported on the support plate 32 by positioning the bin legs 20 in leg receiving receptacles 88 which are secured to and project upwardly from the top side of the plate 32. In the illustrated embodiment of the invention, four receptacles are mounted on the plate 32 adjacent the outer corners thereof to accommodate the four bin legs 20. The receptacles 88 are illustrated as being of a generally oval shape to conform to the shape of the legs 20 on the illustrated bin 12. It is to be understood, however, that the shape of the receptacles 88 is determined by the shape of the legs 20 on the particular bins to be used with the apparatus 10 and that in the event the bins to be used with the apparatus 10 have no legs, a single receptacle of a size and shape to accommodate the lower end of the bin is provided on the plate 32. The receptacles 88 are shown located at the remote corners of the H-shape plate 32 and are spaced apart in a manner corresponding to the spacing of the legs 20.

After the bin 12 is supported on the plate 32 with the legs 20 positioned in the receptacles 88, the motor 86 is operated so as to effect rotation of the drive shaft 70. This rotation effects alternate movement of the plate 32 to the left and right of the neutral position shown in FIG. 1. When the plate 32 is moved to the left of the neutral position, the yieldable bodies 42 in the mounting members 40 are deformed as shown in FIG. 5 and when the plate 32 is moved to the right of the neutral position, the bodies 42 are similarly deformed in the opposite direction. It has been found that a movement of the granular mass 22 to a position in which the top surface thereof is substantially level, as represented by the broken line 90 in FIG. 1 is most readily effected by reciprocating the plate 32 so as to obtain a "high amplitude-low frequency" movement of the plate 32. In other words, the plate 32 is moved substantial distances to the right and left of the neutral position illustrated in FIG. 1 a relative small number of times per minute. In one embodiment of the invention, the plate 32 is moved through 300–400 cycles of movement per minutes and is moved a total horizontal distance of about 2/10 of an inch twice during each cycle. More specifically, starting with the plate 32 in the position shown in FIG. 1, it is moved to the left 1/10 of an inch, back to the right 2/10 of an inch, and back to the left 1/10 of an inch and this cycle of movement is repeated 300–400 times per minute. The amplitude of the plate movement is determined by the extent of the eccentricity of the shaft section 68 and to obtain the above-described movement, the center of the shaft section 68 is offset 1/10 of an inch relative to the portions of the shaft which are supported in the pillow blocks 72. Thus by high amplitude is meant an amplitude of about 2/10 of an inch movement of the bin 12 and by low frequency is meant about 300–400 cycles of the plate 32 per minute. The upper limit of amplitude is determined by practical limitations, namely, the amount of eccentricity in the drive shaft 70 which can be economically effected and, similarly, the lower limit of the frequency is determined by the practical consideration of the speed with which leveling is to be effected.

It is seen therefore that the bin 12 is moved back and forth in a substantially horizontal direction without any substantial vertical movement of the bin 12 to effect a leveling of the granular material 22 which has been mounded in the bin by virtue of the bin being filled through the central opening 16 and the physical characteristics of the material 22 which cause it to mound. The high amplitude-low frequency movement of the bin 12 effects a rapid leveling of the material 22 without any tendency of the movement of the bin 12 to break up or powder the bin contents. By mounting the apparatus 10 at a filling station for a bin 12, and merely operating the apparatus 10 during the final stages of filling of the bin 12, a full utilization of the capacity of the bin is obtainable.

It will be understood that the apparatus for leveling bulk material in a container which is herein disclosed and described is presented for purposes of explanation and illustration and is not intended to indicate limits of the invention, the scope of which is defined by the following claims.

What is claimed is:

1. In apparatus for leveling a mass of granular material in a bin having four downwardly projecting supporting legs, a substantially horizontal base member, a generally H-shaped bin supporting plate disposed above and in a vertically spaced relation with said base member, a plurality of upright yieldable mounting members connected at their lower ends to said base member so that they project upwardly therefrom, means connecting the upper ends of said mounting members to said supporting plate so that said supporting plate is supported on said mounting members, each of said mounting members being constructed so that it is deformable such that the upper end thereof is shiftable horizontally relative to the lower end thereof so that said plate is movable in a substantially horizontal direction relative to said base member, bin leg receiving means secured to said plate adjacent the outer corners thereof and extended upwardly therefrom, said leg receiving means being arranged on said plate so that said bin legs are positionable therein, a connecting rod having a substantially horizontal cylindrical opening formed at one end thereof, means including a substantially horizontal shaft connecting the opposite end of said rod to said supporting plate, and a substantially horizontal drive shaft mounted on said base member and having an eccentric portion disposed in said opening so that rotation of said drive shaft effects only substantially horizontal reciprocal movement of said supporting plate relative to said base member.

2. In apparatus for leveling a mass of granular material in a bin having four downwardly projecting supporting legs, a substantially horizontal base member, a generally H-shape bin supporting plate disposed above and in a vertically spaced relation with said base member, a plurality of mounting members formed of a resilient yieldable material and connected at their lower ends to said base member so that they project upwardly therefrom, means including upright bolt members connecting the upper ends of said mounting members to said supporting plate so that said plate is supported on said mounting members each of said mounting members being constructed so that it is deformable such that the upper end thereof is shiftable horizontally relative to the lower end thereof so that said plate is movable in a substantially horizontal direction relative to said base member, four receptacles secured to said plate adjacent the outer corners thereof and extended upwardly therefrom, said receptacles being arranged on said plate so that said bin legs are positionable therein, a connecting rod having a substantially horizontal cylindrical opening formed at one end thereof, means including a substantially horizontal shaft connecting the opposite end of said rod to said supporting plate, and a substantially horizontal drive shaft mounted on said base member and having an eccentric portion disposed in said opening so that rotation of said drive shaft effects only substantially horizontal reciprocal movement of said supporting plate relative to said base member.

References Cited in the file of this patent
UNITED STATES PATENTS

| | | |
|---|---|---|
| 1,910,980 | Bennett | May 23, 1933 |
| 2,143,610 | Muller et al. | Jan. 10, 1939 |
| 2,549,692 | Lentz | Apr. 17, 1951 |
| 2,706,112 | Carrier | Apr. 12, 1955 |
| 2,914,313 | Morris | Nov. 24, 1959 |

FOREIGN PATENTS

| | | |
|---|---|---|
| 874,833 | Germany | of 1953 |